(12) United States Patent
Lert et al.

(10) Patent No.: US 9,694,975 B2
(45) Date of Patent: Jul. 4, 2017

(54) LIFT INTERFACE FOR STORAGE AND RETRIEVAL SYSTEMS

(75) Inventors: John Lert, Wakefield, MA (US); Stephen C. Toebes, Sunderland, MA (US); Robert Sullivan, Wilmington, MA (US); Nathan Ulrich, Lee, NH (US)

(73) Assignee: Symbotic, LLC, Wilmington, MA (US)

( * ) Notice: Subject to any disclaimer, the term of this patent is extended or adjusted under 35 U.S.C. 154(b) by 1560 days.

(21) Appl. No.: 12/757,354

(22) Filed: Apr. 9, 2010

(65) Prior Publication Data

US 2010/0322746 A1    Dec. 23, 2010

Related U.S. Application Data

(60) Provisional application No. 61/168,349, filed on Apr. 10, 2009.

(51) Int. Cl.
| | |
|---|---|
| *B65G 1/00* | (2006.01) |
| *B65G 1/04* | (2006.01) |
| *B65G 1/06* | (2006.01) |
| *B65G 1/137* | (2006.01) |
| *B65G 47/57* | (2006.01) |
| *B65G 1/127* | (2006.01) |
| *B65G 1/10* | (2006.01) |

(52) U.S. Cl.
CPC ........... *B65G 1/0492* (2013.01); *B65G 1/045* (2013.01); *B65G 1/065* (2013.01); *B65G 1/10* (2013.01); *B65G 1/127* (2013.01); *B65G 1/137* (2013.01); *B65G 1/1371* (2013.01); *B65G 1/1373* (2013.01); *B65G 1/1378* (2013.01); *B65G 47/57* (2013.01); *Y10S 901/01* (2013.01)

(58) Field of Classification Search
USPC ................................ 414/277, 279, 280, 284
See application file for complete search history.

(56) References Cited

U.S. PATENT DOCUMENTS

| | | | |
|---|---|---|---|
| 2,945,604 | A | 7/1960 | Kroll et al. |
| 2,996,621 | A | 8/1961 | Barret, Jr. |
| 3,110,131 | A | 11/1963 | Jeffress |
| 3,161,303 | A | 12/1964 | Burrows |

(Continued)

FOREIGN PATENT DOCUMENTS

| | | |
|---|---|---|
| DE | 2019669 | 11/1971 |
| DE | 4104527 | 8/1992 |

(Continued)

*Primary Examiner* — Saul Rodriguez
*Assistant Examiner* — Willie Berry, Jr.
(74) *Attorney, Agent, or Firm* — Perman & Green, LLP (57) ABSTRACT

A transport system for a storage and retrieval system having an array of storage levels, each storage level having respective storage areas, the transport system including a vertical conveyor having a frame and support shelves movably coupled to the frame, each support shelf being configured to hold one or more uncontained case units in predetermined areas of the support shelf, and transfer vehicles disposed on respective ones of the storage levels, the vertical conveyor having a conveyor to transfer vehicle interface configured to transfer the uncontained case units substantially directly between the support shelves and the transfer vehicles for transport to the storage areas in substantially one transfer vehicle picking operation.

10 Claims, 9 Drawing Sheets

(56) References Cited

U.S. PATENT DOCUMENTS

| | | | |
|---|---|---|---|
| 3,175,940 A | 3/1965 | Talmey | |
| 3,369,648 A | 2/1968 | Wentz | |
| 3,554,390 A | 1/1971 | Saul | |
| 3,677,421 A | 7/1972 | Kintner | |
| 3,719,408 A | 3/1973 | Fullington et al. | |
| 3,737,056 A | 6/1973 | Hathcock, Jr. | |
| 3,802,580 A | 4/1974 | Castaldi | |
| 3,970,840 A | 7/1976 | De Bruine | |
| 4,064,986 A | 12/1977 | Bertovich | |
| 4,273,234 A | 6/1981 | Bourgeois | |
| 4,307,988 A * | 12/1981 | Page et al. | 414/276 |
| 4,395,181 A | 7/1983 | Loomer | |
| 4,406,570 A | 9/1983 | Duncan et al. | |
| 4,428,708 A | 1/1984 | Burt | |
| 4,459,078 A | 7/1984 | Chiantella | |
| 4,492,504 A | 1/1985 | Hainsworth | |
| 4,678,390 A | 7/1987 | Bonneton et al. | |
| 4,679,149 A | 7/1987 | Merz | |
| 4,716,530 A | 12/1987 | Ogawa et al. | |
| 4,786,229 A | 11/1988 | Henderson | |
| 4,811,229 A | 3/1989 | Wilson | |
| 4,936,738 A | 6/1990 | Brennan | |
| 5,002,449 A | 3/1991 | Kita et al. | |
| 5,015,145 A | 5/1991 | Angell et al. | |
| 5,096,355 A | 3/1992 | Schroder | |
| 5,134,353 A | 7/1992 | Kita et al. | |
| 5,134,940 A | 8/1992 | Fujita et al. | |
| 5,135,344 A | 8/1992 | Kita et al. | |
| 5,140,787 A | 8/1992 | Corcoran | |
| 5,179,329 A | 1/1993 | Nishikawa et al. | |
| 5,238,100 A | 8/1993 | Rose et al. | |
| 5,271,703 A | 12/1993 | Lindqvist et al. | |
| 5,273,392 A | 12/1993 | Bernard, II et al. | |
| 5,333,982 A | 8/1994 | Tanizawa et al. | |
| 5,370,492 A | 12/1994 | Gleyze et al. | |
| 5,379,229 A | 1/1995 | Parsons et al. | |
| 5,380,139 A | 1/1995 | Pohjonen et al. | |
| 5,388,955 A | 2/1995 | Schroder | |
| 5,403,147 A | 4/1995 | Tanaka | |
| 5,425,612 A | 6/1995 | Ebstein | |
| 5,472,309 A | 12/1995 | Bernard, II et al. | |
| 5,525,884 A | 6/1996 | Sugiura et al. | |
| 5,529,165 A | 6/1996 | Shupert | |
| 5,601,395 A | 2/1997 | Lichti, Sr. et al. | |
| 5,611,422 A | 3/1997 | Harkonen | |
| 5,615,992 A | 4/1997 | Proske et al. | |
| 5,718,551 A | 2/1998 | Ebstein | |
| 5,764,014 A | 6/1998 | Jakeway et al. | |
| 5,801,506 A | 9/1998 | Netzler | |
| 5,833,431 A | 11/1998 | Rosse, III et al. | |
| 5,839,872 A | 11/1998 | Goto et al. | |
| 5,927,926 A | 7/1999 | Yagi et al. | |
| 5,988,306 A | 11/1999 | Ooishi | |
| 6,036,427 A | 3/2000 | Kita et al. | |
| 6,149,366 A | 11/2000 | Deandrea | |
| 6,158,566 A | 12/2000 | Pollock | |
| 6,272,406 B2 | 8/2001 | Alofs et al. | |
| 6,325,586 B1 | 12/2001 | Loy | |
| 6,341,269 B1 | 1/2002 | Dulaney et al. | |
| 6,345,217 B1 | 2/2002 | Zeitler et al. | |
| 6,390,756 B1 | 5/2002 | Isaacs et al. | |
| 6,391,226 B1 | 5/2002 | Chauvette et al. | |
| 6,503,043 B1 | 1/2003 | Smith et al. | |
| 6,652,213 B1 | 11/2003 | Mitchell et al. | |
| 6,721,638 B2 | 4/2004 | Zeitler | |
| 6,748,292 B2 | 6/2004 | Mountz | |
| 6,861,154 B2 | 3/2005 | Olson et al. | |
| 6,864,489 B2 | 3/2005 | Chen et al. | |
| 6,929,440 B1 | 8/2005 | Grond | |
| 6,948,899 B2 | 9/2005 | Lee | |
| 6,950,722 B2 | 9/2005 | Mountz | |
| 7,008,164 B2 | 3/2006 | Rokkaku | |
| 7,025,191 B2 | 4/2006 | Lichti et al. | |
| 7,101,139 B1 | 9/2006 | Benedict | |
| 7,184,855 B2 | 2/2007 | Stingel et al. | |
| 7,266,422 B1 | 9/2007 | DeMotte et al. | |
| 7,329,081 B2 | 2/2008 | Baker et al. | |
| 7,402,018 B2 | 7/2008 | Mountz et al. | |
| 7,495,561 B2 | 2/2009 | Bodin et al. | |
| 7,536,283 B2 | 5/2009 | Potter et al. | |
| 7,591,630 B2 | 9/2009 | Lert, Jr. | |
| 7,671,293 B2 | 3/2010 | Fry et al. | |
| 7,686,560 B2 | 3/2010 | Laurin et al. | |
| 7,751,928 B1 | 7/2010 | Antony et al. | |
| 7,991,505 B2 | 8/2011 | Lert et al. | |
| 8,480,347 B2 | 7/2013 | Schafer | |
| 8,594,835 B2 | 11/2013 | Lert et al. | |
| 2002/0029719 A1 | 3/2002 | Matsukawa | |
| 2002/0076307 A1 | 6/2002 | Fallin et al. | |
| 2003/0033217 A1 | 2/2003 | Cutlip | |
| 2003/0200129 A1 | 10/2003 | Klaubauf et al. | |
| 2004/0065523 A1 | 4/2004 | Lichti et al. | |
| 2004/0093116 A1 | 5/2004 | Mountz | |
| 2004/0238326 A1 | 12/2004 | Lichti | |
| 2005/0047895 A1 | 3/2005 | Lert, Jr. | |
| 2006/0104712 A1 | 5/2006 | Bufano et al. | |
| 2006/0257236 A1 | 11/2006 | Stingel, III et al. | |
| 2007/0021864 A1 | 1/2007 | Mountz et al. | |
| 2007/0177011 A1 | 8/2007 | Lewin et al. | |
| 2007/0288123 A1 | 12/2007 | D'andrea et al. | |
| 2007/0290040 A1 | 12/2007 | Wurman et al. | |
| 2007/0293978 A1 | 12/2007 | Wurman et al. | |
| 2008/0001372 A1 | 1/2008 | Hoffman et al. | |
| 2008/0166217 A1 | 7/2008 | Fontana | |
| 2008/0215180 A1 | 9/2008 | Kota | |
| 2008/0269960 A1 | 10/2008 | Kostmann | |
| 2009/0074545 A1 | 3/2009 | Lert, Jr. et al. | |
| 2009/0114115 A1 | 5/2009 | Minges | |
| 2009/0185884 A1 | 7/2009 | Wurman et al. | |
| 2009/0255213 A1 | 10/2009 | Schwartau | |
| 2010/0158648 A1 | 6/2010 | Schafer | |
| 2010/0322746 A1 | 12/2010 | Lert et al. | |

FOREIGN PATENT DOCUMENTS

| | | |
|---|---|---|
| DE | 20011661 | 12/2000 |
| DE | 10142395 | 11/2002 |
| EP | 0282592 | 9/1988 |
| EP | 0737630 | 10/1996 |
| EP | 0847943 | 6/1998 |
| EP | 1598291 | 11/2005 |
| EP | 1627830 | 2/2006 |
| EP | 1775240 | 4/2007 |
| FR | 2730715 | 8/1996 |
| JP | 4735387 | 9/1972 |
| JP | 01275310 | 6/1989 |
| JP | 01303211 | 12/1989 |
| JP | 02008106 | 11/1990 |
| JP | 06316309 | 11/1994 |
| JP | 8113321 | 5/1996 |
| JP | 11011652 | 1/1999 |
| JP | 2000085921 | 3/2000 |
| JP | 2001171831 | 6/2001 |
| JP | 2001344020 | 12/2001 |
| JP | 2002356207 | 12/2002 |
| JP | 2003012117 | 1/2003 |
| JP | 2004131258 | 4/2004 |
| JP | 3102245 | 7/2004 |
| JP | 2005277049 | 10/2005 |
| JP | 2008150673 | 4/2008 |
| WO | 9534491 | 12/1995 |
| WO | 2005009324 | 2/2005 |
| WO | 2005056943 | 6/2005 |
| WO | 2006024035 | 2/2006 |
| WO | 2006095047 | 9/2006 |
| WO | 2008125294 | 10/2008 |

\* cited by examiner

LIFT INTERFACE FOR STORAGE AND RETRIEVAL SYSTEMS

CROSS REFERENCE TO RELATED APPLICATIONS

This application claims the benefit of U.S. Provisional Patent Application No. 61/168,349 filed on Apr. 10, 2009, the disclosure of which is incorporated herein by reference in its entirety.

This application is related to U.S. patent application Ser. No. 12/757,381, entitled "STORAGE AND RETRIEVAL SYSTEM," filed on Apr. 9, 2010; with U.S. patent application Ser. No. 12/757,337, entitled "CONTROL SYSTEM FOR STORAGE AND RETRIEVAL SYSTEMS," filed on Apr. 9, 2010; with U.S. patent application Ser. No. 12/757,220, entitled "STORAGE AND RETRIEVAL SYSTEM," filed on Apr. 9, 2010; and U.S. patent application Ser. No. 12/757,312, entitled "AUTONOMOUS TRANSPORTS FOR STORAGE AND RETRIEVAL SYSTEMS," filed on Apr. 9, 2010, the disclosures of which are incorporated by reference herein in their entireties.

BACKGROUND

1. Field

The exemplary embodiments generally relate to material handling systems and, more particularly, to automated storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally, where the case units are stored in multilevel racks, case units are placed on the different levels of the racks with a lifting device on the transport device. Where the case units are stored in racks located on different floors or levels of the storage structure the case units are generally transported between the floors while disposed on the transport devices where the transport devices travel up and down ramps spanning between the floors. In other examples the transport device with the case units disposed thereon are raised and lowered between the floors with an elevator. Generally, the case units carried by the transport devices and stored on the storage racks are contained in carriers, for example storage containers such as trays, totes or shipping cases, or on pallets. Generally, incoming pallets to the warehouse (such as from manufacturers) contain shipping containers (e.g. cases) of the same type of goods. Outgoing pallets leaving the warehouse, for example, to retailers have increasingly been made of what may be referred to as mixed pallets. As may be realized, such mixed pallets are made of shipping containers (e.g. totes or cases such as cartons, etc.) containing different types of goods. For example, one case on the mixed pallet may hold grocery products (soup can, soda cans, etc.) and another case on the same pallet may hold cosmetic or household cleaning or electronic products. Indeed some cases may hold different types of products within a single case. Conventional warehousing systems, including conventional automated warehousing systems do not lend themselves to efficient generation of mixed goods pallets. In addition, storing case units in, for example carriers or on pallets generally does not allow for the retrieval of individual case units within those carriers or pallets without transporting the carriers or pallets to a workstation for manual or automated removal of the individual case units.

It would be advantageous to be able to transport uncontained or unpalletized case units between levels of a storage facility independent of transport device movement between the levels.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
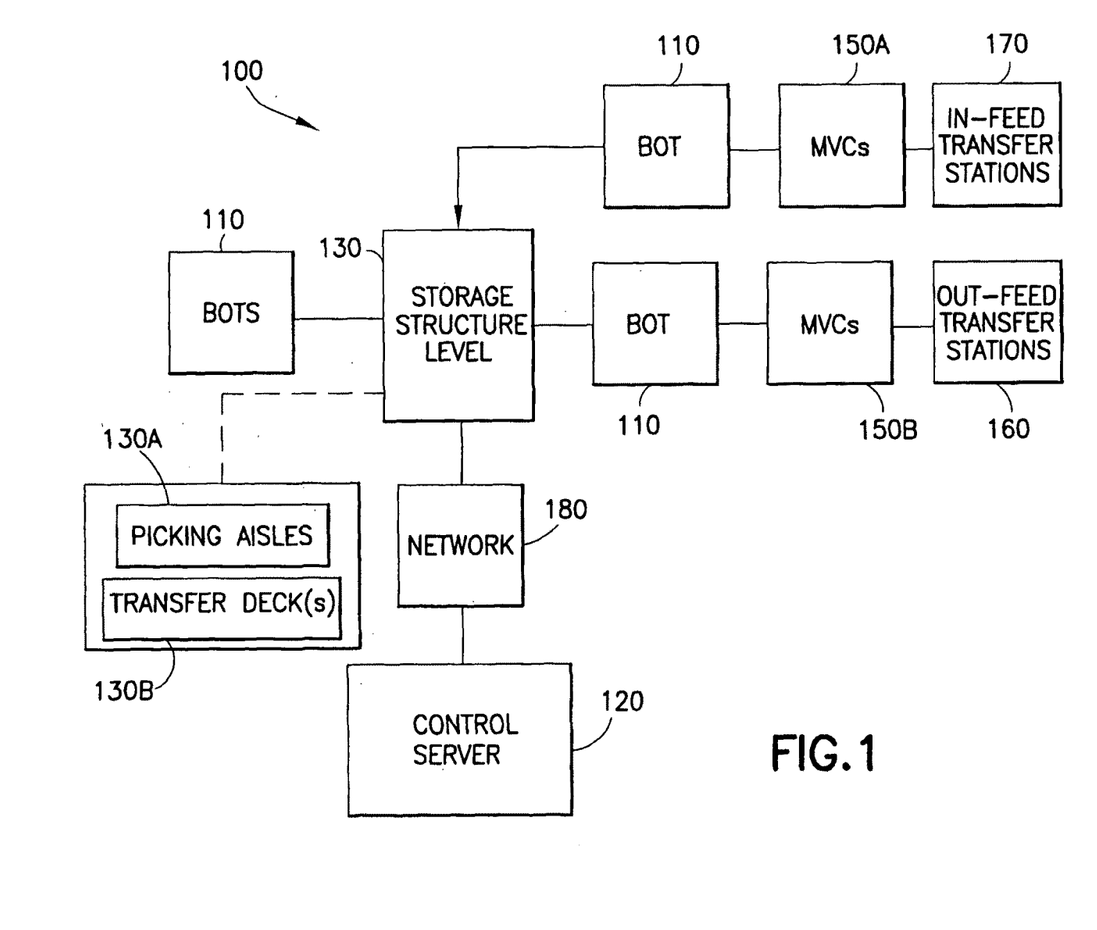
FIG. 1 schematically illustrates an exemplary storage and retrieval system in accordance with an exemplary embodiment.

FIG. 1 generally schematically illustrates a storage and retrieval system 100 in accordance with an exemplary embodiment. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with one exemplary embodiment the storage and retrieval system 100 may operate in a retail distribution center or warehouse to, for example, fulfill orders received from retail stores for case units (where case units as used herein means items not stored in trays, on totes or on pallets, e.g. uncontained). It is noted that the case units may include cases of items (e.g. case of soup cans, boxes of cereal, etc.) or individual items that are adapted to be taken off of or placed on a pallet. In accordance with the exemplary embodiments, shipping cases or case units (e.g. cartons, barrels, boxes, crates, jugs, or any other suitable device for holding items) may have variable sizes and may be used to hold items in shipping and may be configured so they are capable of being palletized for shipping. It is noted that when, for example, pallets of items arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In alternate embodiments the storage and retrieval system described herein may be applied to any environment in which items are stored and retrieved.

The storage and retrieval system 100 may be configured for installation in, for example, existing warehouse structures or adapted to new warehouse structures. In one exemplary embodiment, the storage and retrieval system 100 may be substantially similar to that described in U.S. patent application Ser. No. 12/757,381, entitled "STORAGE AND RETRIEVAL SYSTEM," previously incorporated herein by reference in its entirety. In one example, the storage and retrieval system 100 may include in-feed and out-feed transfer stations 170, 160, multilevel vertical conveyors 150A, 150B (MVCs), a storage structure 130, and a number of autonomous vehicular transport robots 110 (referred to herein as "bots"). In alternate embodiments the storage and retrieval system may also include robot or bot transfer stations 140 (FIGS. 6A-6D) that may provide an interface between the bots 110 and the multilevel vertical conveyors 150A, 150B. The in-feed transfer stations 170 and out-feed transfer stations 160 may operate together with their respective multilevel vertical conveyors 150A, 150B for transferring items to and from one or more levels of a multi-level storage structure 130. It is noted that while the multilevel vertical conveyors are described herein as being dedicated inbound conveyors 150A and outbound conveyors 150B, in alternate embodiments each of the conveyors 150A, 150B may be used for both inbound and outbound transfer of case units/items from the storage and retrieval system. Bots 110 may be disposed on each level of the multi-level storage structure 130 so that the bots 110 on a respective level can traverse an entirety of that level. The bots 110 may be configured to place items, such as the above described retail merchandise, into picking stock as described in U.S. patent application Ser. No. 12/757,312, entitled "AUTONOMOUS TRANSPORTS FOR STORAGE AND RETRIEVAL SYSTEMS," previously incorporated by reference herein in its entirety. In one exemplary embodiment, the bots 110 may be configured to interface directly with the shelves of the multilevel vertical conveyors 150A, 150B. In alternate embodiments the bots 110 may be interface indirectly with the multilevel vertical conveyors 150A, 150B through, for example, bot transfer stations 140 disposed on a respective level of the multi-level storage structure 130.

As described above, the storage structure 130 may include multiple levels of storage rack modules where, in one exemplary embodiment, each level includes respective picking aisles 130A and at least one transfer deck 130B for allowing the bots 110 to traverse respective levels of the storage structure 130 for transferring case units between any of the storage areas of the storage structure 130 and any shelf of any multilevel vertical conveyor 150A, 150B. The picking aisles 130A, and transfer decks 130B also allow the bots 110 to place case units into picking stock and to retrieve ordered case units. In alternate embodiments each level may include bot transfer stations 140 for allowing the exchange of items between the multilevel vertical conveyors 150A, 150B and a bot on a respective storage level of the storage structure 130. The storage structure 130 may be substantially similar to the storage structure described in U.S. patent application Ser. No. 12/757,381, entitled "STORAGE AND RETRIEVAL SYSTEM," previously incorporated by reference in its entirety.

One or more central system control computers (e.g. control server) 120 may coordinate or otherwise control the operation of the multilevel vertical conveyors 150A, 150B with other suitable features of the storage and retrieval system 100 in a manner substantially similar to that described in U.S. patent application Ser. No. 12/757,337, entitled "CONTROL SYSTEM FOR STORAGE AND RETRIEVAL SYSTEMS," with U.S. patent application Ser. No. 12/757,220, entitled "STORAGE AND RETRIEVAL SYSTEM,", previously incorporated herein by reference in their entirety. For example, the control server 120 may control the operation of the storage and retrieval system 100 through, for example, any suitable communications network 180.

The storage structure 130 of the exemplary embodiments may be arranged such that there is no vertical or horizontal array partitioning of the storage structure. For example, each multilevel vertical conveyor 150A, 150B may be common to all or substantially all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). Conversely case units from any shelf of each multilevel vertical conveyor 150A, 150B can be transferred to any or each storage space throughout the storage structure or to each storage space of any level of the storage structure. The multilevel vertical conveyors 150A, 150B can also receive case units from any storage space on any level of the storage structure 130 (e.g. no horizontal partitioning).

Figure 2A:
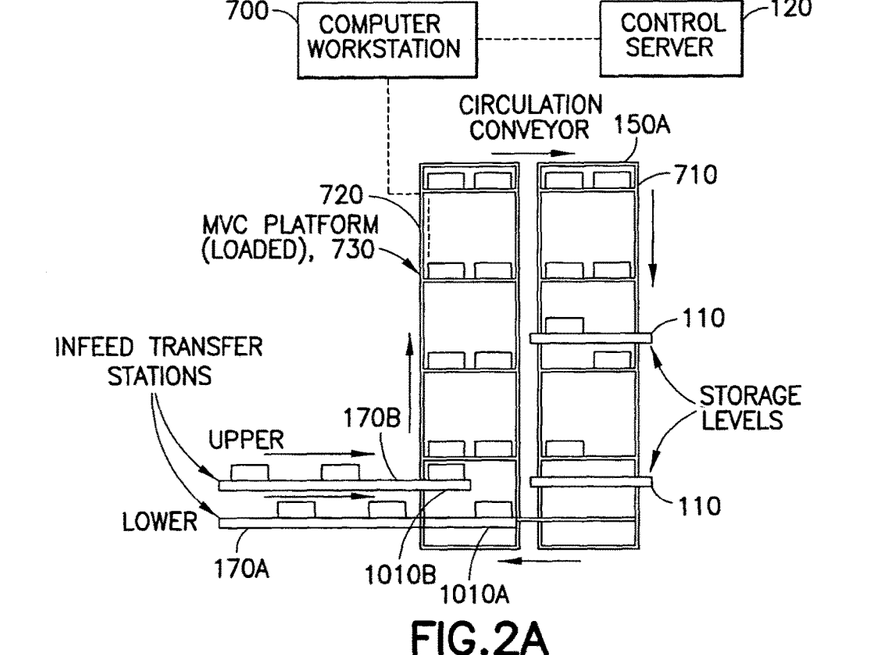
FIGS. 2A, 2B, 2C, 2D, 3A and 3B illustrate schematic views of a conveyor system in accordance with an exemplary embodiment.

Referring now to FIG. 2A, the multilevel vertical conveyors will be described in greater detail. It is noted that the input multilevel vertical conveyor 150A and associated in-feed transfer stations 170, however, the out-feed multilevel vertical conveyors 150B, bot transfer stations 140B and out-feed transfer stations 160 may be substantially similar to that described below for their in-feed counterparts but for the direction of material flow out of the storage and retrieval system 100 rather than into the storage and retrieval system 100. As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s), uncontained or without containment (e.g. case unit(s) are not sealed in trays), can be transferred from a multilevel vertical conveyor 150A, 150B to each storage space on a respective level and from each storage space to any one of the multilevel vertical conveyors 150A, 150B on a respective level. The bots 110 may be configured to transfer the uncontained case units between the storage spaces and the multilevel vertical conveyors with one pick (e.g. substantially directly between the storage spaces and the multilevel vertical conveyors). By way of further example, the designated bot 110 picks the uncontained case unit(s) from a shelf of a multilevel vertical conveyor, transports the uncontained case unit(s) to a predetermined storage area of the storage structure 130 and places the uncontained case unit(s) in the predetermined storage area (and vice versa).

Generally, the multilevel vertical conveyors include payload shelves 730 (FIGS. 2A-4) attached to chains or belts that form continuously moving or circulating vertical loops (the shape of the loop shown in the Figs. is merely exemplary and in alternate embodiments the loop may have any suitable shape including rectangular and serpentine) that move at a substantially constant rate, so that the shelves 730 use what may be referred to as the "paternoster" principle of continuous conveyance, with loading and unloading performed at any point in the loop without slowing or stopping. The multilevel vertical conveyors 150A, 150B may be controlled by a server, such as for example, control server 120, or any other suitable controller. One or more suitable computer workstations 700 may be connected to the multilevel vertical conveyors 150A, 150B and the server 120 in any suitable manner (e.g. wired or wireless connection) for providing, as an example, inventory management, multilevel vertical conveyor functionality and control, and customer order fulfillment. As may be realized, the computer workstations 700 and/or server 120 may be programmed to control the in-feed and/or out-feed conveyor systems. In alternate embodiments, the computer workstations 700 and/or server 120 may also be programmed to control the transfer stations 140. In one exemplary embodiment, one or more of the workstations 700 and control server 120 may include a control cabinet, a programmable logic controller and variable frequency drives for driving the multilevel vertical conveyors 150A, 150B. In alternate embodiments the workstations 700 and/or control server 120 may have any suitable components and configuration. In one exemplary embodiment, the workstations 700 may be configured to substantially remedy any exceptions or faults in the in-feed and/or out-feed conveyor systems substantially without operator assistance and communicate fault recovery scenarios with the control server 120 and/or vice versa.

Figure 4:
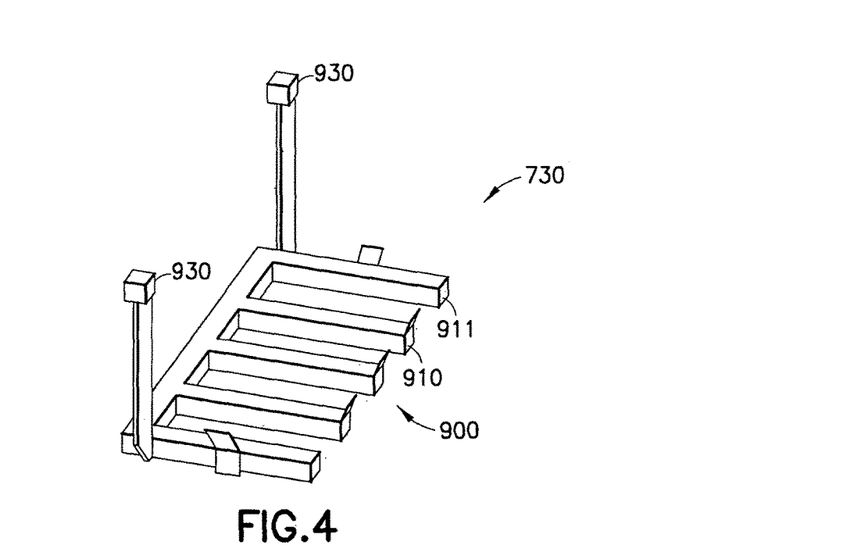
FIG. 4 illustrates a schematic view of a conveyor shelf in accordance with an exemplary embodiment.

Referring also to FIG. 4, in this exemplary embodiment, the multilevel vertical conveyors 150A may include a frame 710 configured to support driven members such as, for example, chains 720. The chains 720 may be coupled to the shelves 730, which are movably mounted to the frame 710 such that the chains 720 effect substantially continuous movement of the shelves 730 around the frame 710. In alternate embodiments, any suitable drive link, such as for example, belts or cables may be used to drive the shelves 730. Each shelf 730 may include, for example, supports 930 and a platform 900. The supports 930 may extend from the platform 900 and be configured for attaching and mounting the shelf 730 to, for example, one or more drive chains 720. The platform 900 may include, for example, any suitably shaped frame 911, which in this example is generally "U" shaped (e.g. having lateral members connected by a span member at one end), and any suitable number of spaced apart fingers 910 extending from the frame 911. The fingers 910 may be configured for supporting the pickfaces 750, 752 (FIG. 2B) where each pickface comprises at least one uncontained case unit. In one exemplary embodiment, each of the fingers 910 may be removably fastened to a frame 911 for facilitating replacement or repair of individual fingers 910. The fingers 910, frame 911 (and supports 930) may form an integral structure or platform that defines the seating surface that contacts and supports the uncontained case units. It is noted that the shelf 730 illustrates only a representative structure and in alternate embodiments, the shelves 730 may have any suitable configuration and size for transporting pickfaces 750, 752. The spaced apart fingers 910 are configured to interface with, for example, a transfer arm or effector of the bots 110 and the in-feed transfer stations 170 for transferring the loads 750, 752 between the multilevel vertical conveyor 150A and one or more of the transfer stations 170 and bots 110. In alternate embodiments, the spaced apart fingers 900 may be configured to interface with bot transfer stations 140 as described below.

The multilevel vertical conveyors 150A may also include a suitable stabilizing device(s), such as for example, driven stabilizing chains for stabilizing the shelves 730 during vertical travel. In one example, the stabilizing devices may include chain driven dogs that are engaged to the shelves in both the upward and downward directions to form, for example, a three point engagement with the shelf supports 930. The drive chains 720 for the shelves 730 and stabilizing devices may be drivingly coupled to for example, any suitable number of drive motors under the control of, for example, one or more of the computer workstations 700 and control server 120.

Figure 2B:
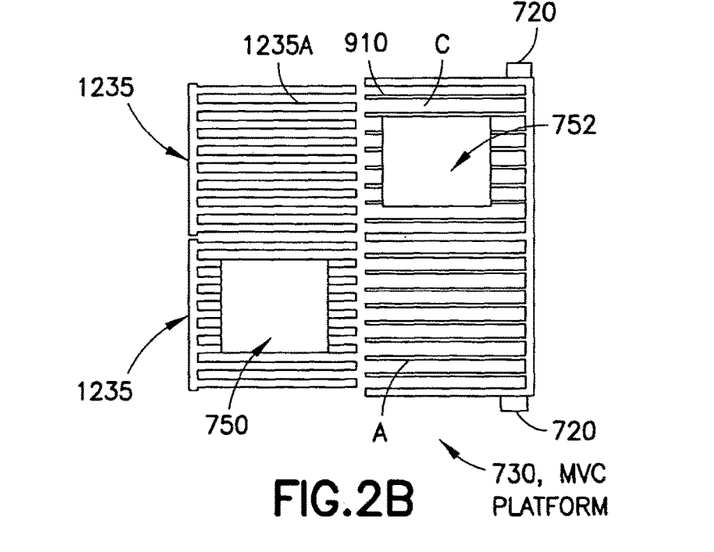
Figure 5:
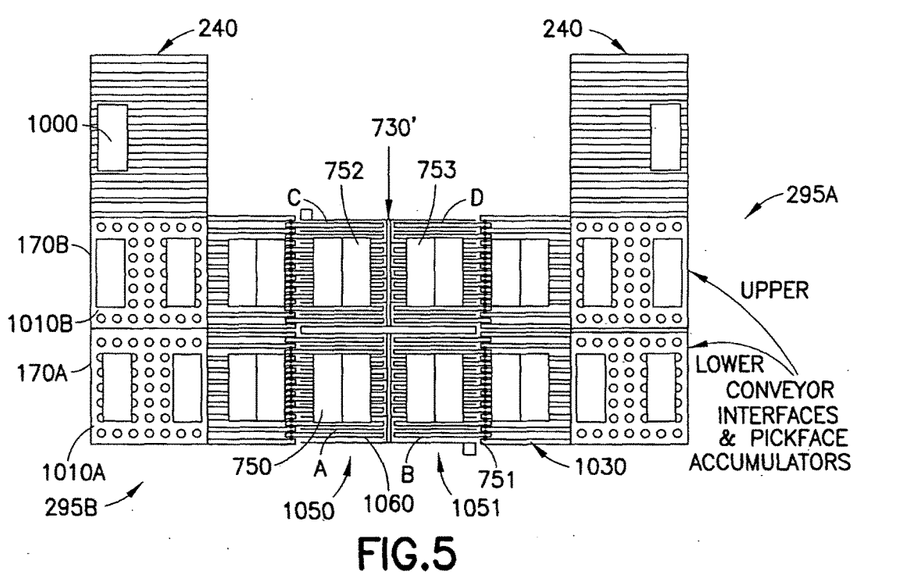
FIG. 5 schematically illustrates a conveyor system in accordance with an exemplary embodiment.

In one exemplary embodiment there may be any suitable number of shelves 730 mounted and attached to the drive chains 720. As can be seen in FIG. 2B each shelf 730 may be configured to carry, for exemplary purposes only, at least two separate pickfaces 750, 752 in corresponding positions A, C on the shelf 730 (e.g. a single vertical conveyor is functionally equivalent to multiple individually operated conveyors arranged adjacent one another). In alternate embodiments, as can be seen in FIG. 5 the shelves 730' may be configured to carry, for exemplary purposes only, four separate pickfaces 750-753 in corresponding positions A-D. In still other alternate embodiments, each shelf may be configured to carry more or less than four separate loads. As described above, each pickface may comprise one or more uncontained case units and may correspond to the load of a single bot 110. As may be realized, the space envelope or area planform of each pickface may be different. By way of example, uncontained cases, such as those directly transported by the multilevel vertical conveyors have various different sizes (e.g. differing dimensions). Also, as noted each pickface may include one or more uncontained cases. Thus, the length and width of each pickface carried by the multilevel vertical conveyors may be different. In alternate embodiments each pickface may be broken between, for example, bots 110 where different portions of the pickface are transported by more than one bot 110 on, for example, different levels of the storage structure 130. As may be realized when a pickface is broken each portion of the broken pickface may be considered as a new pickface by the storage and retrieval system 100. For exemplary purposes only, referring to FIGS. 3A, 3B the shelves 730 of the multilevel vertical conveyors 150A, 150B may be spaced from each other by a predetermined pitch P to allow for placement or removal of loads 810, 820 from the substantially continuously moving shelves 730 as will be described below.

Referring now to FIG. 5, and as described above, the multilevel vertical conveyors, such as conveyor 150A are supplied with uncontained case units 1000 from in-feed transfer stations 170 (FIG. 1). As described above, the in-feed transfer stations 170 may include one or more of depalletizing workstations, conveyors 240, conveyor interfaces/bot load accumulators 1010A, 1010B and conveyor mechanisms 1030. As can be seen in FIG. 5, uncontained case units 1000 are moved from, for example depalletizing workstations by conveyors 240. In this example, each of the positions A-D is supplied by a respective in-feed transfer station. As may be realized, while the transfer of case units is being described with respect to shelves 730' it should be understood that transfer of case units to shelves 730 occurs in substantially the same manner. For example, position A may be supplied by in-feed transfer station 170A and position C may be supplied by in-feed transfer station 170B. Referring also to FIG. 2A the in-feed transfer stations 170A, 170B, for supplying similar sides of the shelf 730 (in this example positions A and C, which are disposed side by side, form a first side 1050 of the shelf 730 and positions B and D, which are disposed side by side, form a second side 1051 of the shelf 730), may be located one above the other in a horizontally staggered stacked arrangement (an exemplary stacked arrangement is shown in FIG. 2A). In other exemplary embodiments, the stacked arrangement may be configured so that the in-feed transfer stations are disposed vertically in-line one above the other and extend into the multilevel vertical conveyors by different amounts for supplying, for example, positions A and B or positions C and D where positions A and B (and positions C and D) are disposed one in front of the other, rather than side by side. In alternate embodiments, the in-feed transfer stations may have any suitable configuration and positional arrangement. As can be seen in FIG. 5, the first side 1050 and second side 1051 of the shelf 730 are loaded (and unloaded) in opposing directions such that each multilevel vertical conveyor 150A is located between respective transfer areas 295A, 295B where the first side 1050 interfaces with a transfer area 295B and the second side 1051 interfaces with transfer area 295A.

In this exemplary embodiment, the accumulators 1010A, 1010B are configured to form the uncontained case units 1000 into the individual pick faces 750-753 prior to loading a respective position A-D on the multilevel vertical conveyor 730. In one exemplary embodiment, the computer workstation 700 and/or control server 120 may provide instructions or suitably control the accumulators 1010A, 1010B (and/or other components of the in-feed transfer stations 170) for accumulating a predetermined number of items to form the pickfaces 750-753. The accumulators 1010A, 1010B may align the case units in any suitable manner (e.g. making one or more sides of the items flush, etc.) and, for example, abut the items together. The accumulators 1010A, 1010B may be configured to transfer the pickfaces 750-753 to respective conveyor mechanisms 1030 for transferring the pickfaces 750-753 to a respective shelf position A-D. In one exemplary embodiment the conveyor mechanisms 1030 may include belts or other suitable feed devices for moving the pickfaces 750-753 onto transfer platforms 1060. The transfer platforms 1060 may include spaced apart fingers for supporting the pickfaces 750-753 where the fingers 910 of the shelves 730 are configured to pass between the fingers of the transfer platforms 1060 for lifting (or placing) the pickfaces 750-753 from the transfer platforms 1060. In another exemplary embodiment, the fingers of the transfer platforms 1060 may be movable and serve to insert the pickfaces 750-753 into the path of the shelves 730 in a manner similar to that described below with respect to the bot transfer stations 140. In alternate embodiments the in-feed transfer stations 170 (and out-feed transfer stations 160) may be configured in any suitable manner for transferring case units (e.g. the pickfaces formed by the case units) onto or from respective multilevel vertical conveyors 150A, 150B.

It is noted that while the interface between the bot transfer stations 140 and the multilevel vertical conveyors 150A, 150B are described it should be understood that interfacing between the bots 110 and the multilevel vertical conveyors 150A, 150B occurs in a substantially similar manner (e.g. as described in U.S. patent application Ser. No. 12/757,312, entitled "AUTONOMOUS TRANSPORTS FOR STORAGE AND RETRIEVAL SYSTEMS," previously incorporated by reference herein in its entirety). For exemplary purposes only, referring now to FIGS. 2B and 6A-6D, the multilevel vertical conveyors 150A transfer pickfaces 750, 752 from, for example, the in-feed transfer stations 170 (or any other suitable device or loading system) to, for example, the bot transfer stations 140 associated with each of the levels in the storage structure 130. In other examples, the pickfaces 750, 752 may be transferred directly from the multilevel vertical conveyors 150A to the bots 110 as described below. As may be realized, the bot transfer stations 140 are disposed on respective levels of the storage structure adjacent the path of travel of the shelves 730 of a respective multilevel vertical conveyor 150A. In one exemplary embodiment, there may be a bot transfer station 140 corresponding to each of the positions A and C on the shelves 730 (and positions A-D with respect to shelf 730'). For example, a first bot transfer station 140 may remove load 750 from position A on shelf 730 while another bot transfer station 140 may remove pickface 752 from position C on shelf 730 and so on.

In other exemplary embodiments, one bot transfer station 140 may serve to remove or place case units in more than one position A, C on the shelves 730. For example, one bot transfer station 140 may be configured for removing pickfaces 750, 752 from one or more of positions A, C of shelf 730. In alternate embodiments, referring also to FIG. 5, one bot transfer station 140 may be configured for removing pickfaces 750, 752 from one or more of positions A, C on a first side 1050 of the shelf 730' while another bot transfer station 140 may be configured to remove pickfaces 751, 753 from one or more positions B, D on a second side 1051 of the shelf 730'. In alternate embodiments the bot transfer stations 140 may have any suitable configuration for accessing any suitable number of positions A-D of the shelves 730, 730'.

Figure 6A:
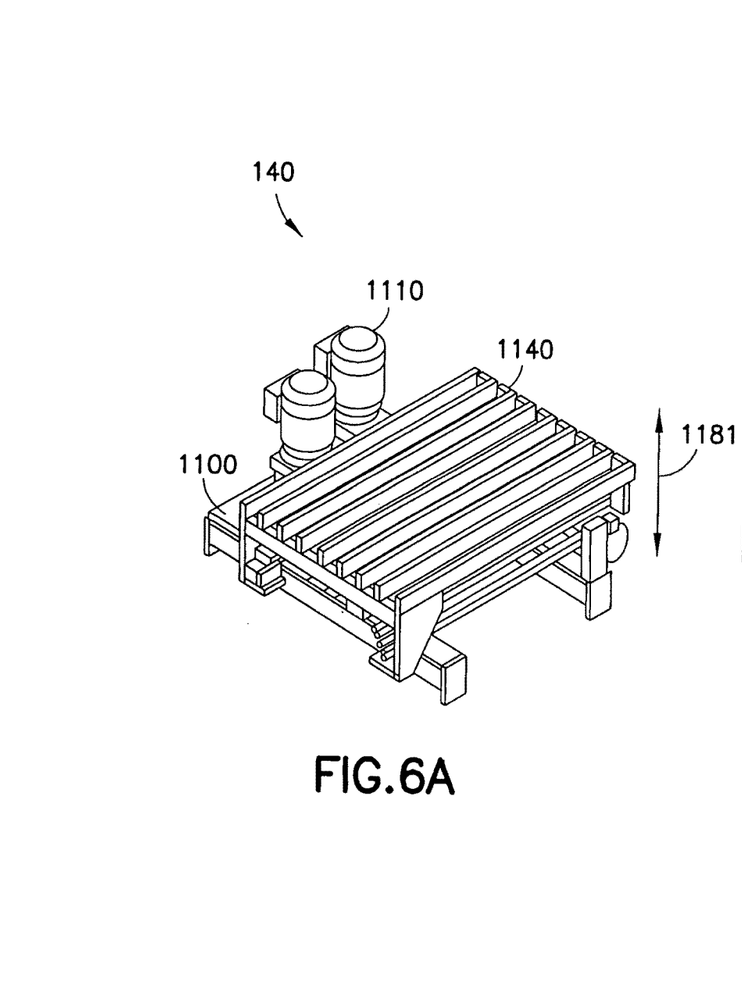
FIGS. 6A-6D schematically illustrate a transfer station in accordance with an exemplary embodiment.
Figure 6B:
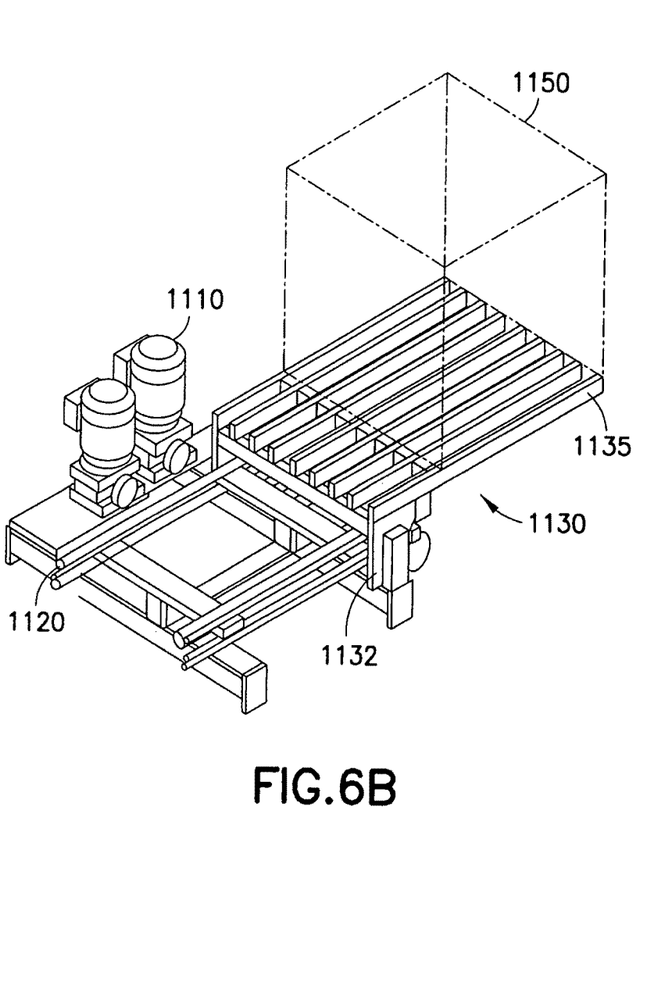
Figure 6C:
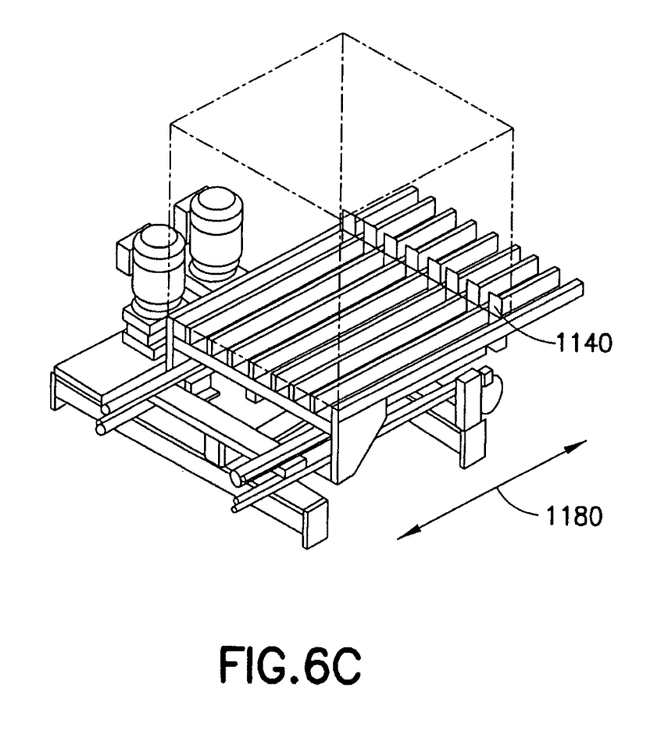

Each bot transfer station 140 may include a frame 1100, one or more drive motors 1110 and a carriage system 1130. The frame 1100 may have any suitable configuration for coupling the bot transfer station 140 to, for example, any suitable supporting feature of the storage structure 130, such as a horizontal or vertical support. The carriage system 1130 may be movably mounted to the frame 1100 through, for example, rails 1120 that are configured to allow the carriage system 1130 to move between retracted and extended positions as shown in FIGS. 6A and 6B. The carriage system 1130 may include a carriage base 1132 and fingers 1135. The fingers 1135 may be mounted to the carriage base 1132 in a spaced apart arrangement so that the fingers 1135 extend from the carriage base 1132 in a cantilevered fashion. It is noted that each finger 1135 may be removably mounted to the carriage base 1132 for facilitating replacement or repair of individual fingers 1135. In alternate embodiments the fingers and carriage base may be of unitary one-piece construction. The fingers 1135 of the bot transfer stations 140 may be configured to pass between the fingers 910 (FIG. 4) of the shelves 730 of the multilevel vertical conveyors 150A (FIG. 1) for removing pickfaces such as pickfaces 1150 (which may be substantially similar to pickfaces 750-753) from the shelves 730. The bot transfer station 140 may also include a load positioning device 1140 that retractably extends between, for example, the spaced apart fingers 1135 in the direction of arrow 1181 for effecting positioning of the pickfaces 1150 in a predetermined orientation relative to the bot transfer station 140. In still other alternate embodiments the carriage system 1130 may have any suitable configuration and/or components. The one or more drive motors 1110 may be any suitable motors mounted to the frame 1100 for causing the extension/retraction of the carriage system 1130 and the extension/retraction of the positioning device 1140 in any suitable manner such as by, for exemplary purposes only, drive belts or chains. In alternate embodiments, the carriage system and positioning device may be extended and retracted in any suitable manner.

Figure 6D:
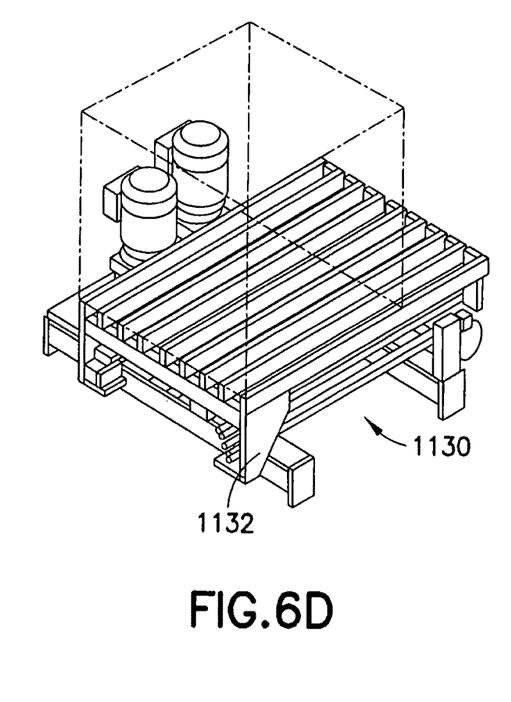
Figure 8:
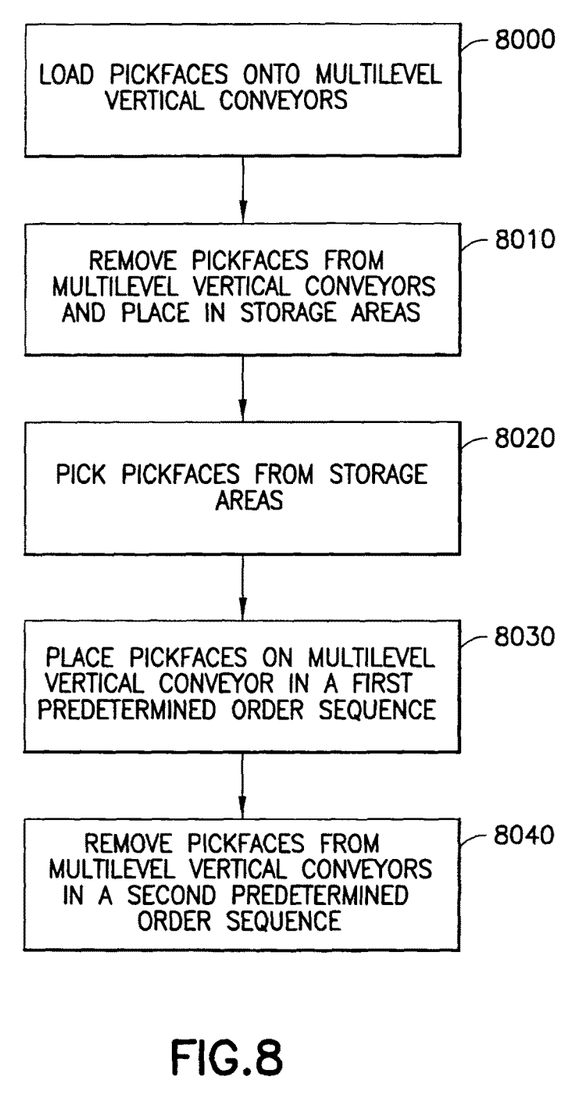
FIG. 8 is a flow diagram of a method in accordance with an exemplary embodiment.

In operation, referring also to FIGS. 2C, 2D, 3A and 3B, inbound pickfaces (e.g. pickfaces, which include one or more case units, that are being transferred into the storage and retrieval system) such as pickface 1150 are loaded on and will circulate around the multilevel vertical conveyor 150A and be removed from a respective conveyor by, for example, one or more bots 110 for placement in a storage area of the storage structure (FIG. 8, Blocks 8000 and 8010). As will be described further below, in the exemplary embodiments the input loading sequencing of case units onto the multilevel vertical conveyors 150A, 150B (e.g. such as at corresponding feeder input sides of transfer stations 170 and bot transfer locations on respective storage levels) may be substantially independent from the output or unloading sequence of the multilevel vertical conveyors 150A, 150B (e.g. such as at corresponding output sides of transfer stations 160 and bot transfer locations on respective storage levels) and vice versa. In one example, the pickface 1150 may be loaded onto the shelves 730 during an upward travel of the multilevel vertical conveyor 150A and off loaded from the shelves 730 during downward travel of the multilevel vertical conveyor 150A. By way of example, multilevel vertical conveyor shelves 730i and 730i i (FIG. 2D) may be loaded sequentially, but when unloaded, shelf 730i i may be unloaded before shelf 730i. It is noted that the shelves 730 may be loaded through one or more cycles of the multilevel vertical conveyor. In alternate embodiments the pickfaces may be loaded or off loaded from the shelves 730 in any suitable manner. As may be realized, the position of the case units on the multilevel vertical conveyor shelf 730 defines the pickface position that the bot 110 picks from. The bot may be configured to pick any suitable load or pickface from the shelf 730 regardless of the pickface position on the shelf 730 or the size of the pickface. In one exemplary embodiment, the storage and retrieval system 100 may include a bot positioning system for positioning the bot adjacent the shelves 730 for picking a desired pickface from a predetermined one of the shelves 730 (e.g. the bot 110 is positioned so as to be aligned with the pickface). The bot positioning system may also be configured to correlate the extension of a bot transfer arm with the movement (e.g. speed and location) of the shelves 730 so that the transfer arm is extended and retracted to remove (or place) pickfaces from predetermined shelves 730 of the multilevel vertical conveyors 150A, 150B. For exemplary purposes only, the bot 110 may be instructed by, for example, the computer workstation 700 or control server 120 (FIG. 2A) to extend the transfer arm into the path of travel of the pickface 1150. As the pickface 1150 is carried by the multilevel vertical conveyor 150A in the direction of arrow 860 fingers of the bot the transfer arm (which may be substantially similar to fingers 1135 of the bot transfer station 140) pass through the fingers 910 of the shelf 730 for transferring the pickface 1150 from the shelf 730 to the carriage system 1135 (e.g. the pickface 1150 is lifted from the fingers 910 via relative movement of the shelf 730 and the bot transfer arm). As may be realized, the pitch P between shelves may be any suitable distance for allowing the transfer of pickfaces between the multilevel vertical conveyor and the bots 110 while the shelves 730 are circulating around the multilevel vertical conveyor at a substantially continuous rate. The bot transfer arm may be retracted (in a manner substantially similar to that shown in FIGS. 6C, 6D with respect to the bot transfer station 140) so that the pickface 1150 is no longer located in the path of travel of the shelves 730 of the multilevel vertical conveyor 150A. It is noted that in alternate embodiments, where the bot transfer stations 140 are used, the positioning device 1140 may be extended through the fingers 1135 and the carriage system 1130 (FIGS. 6A-6D) may be moved in the direction of arrow 1180 for abutting the pickface 1150 against the positioning device 1140 effecting positioning of the pickface 1150 in a predetermined orientation relative to, for example, the bot transfer station 140. The carriage system 1130 may be fully retracted as shown in FIG. 6D for transfer of the pickface 1150 to a bot 110.

Figure 2C:
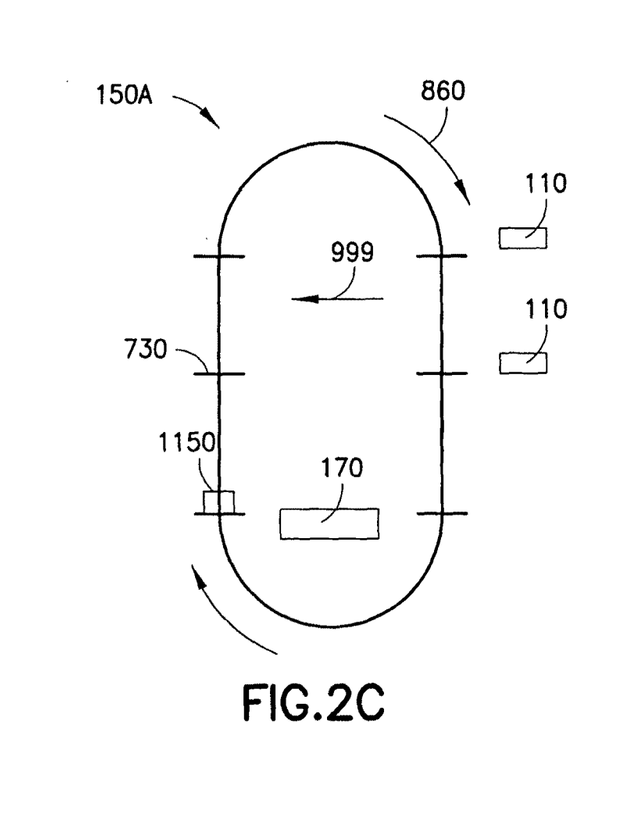
Figure 2D:
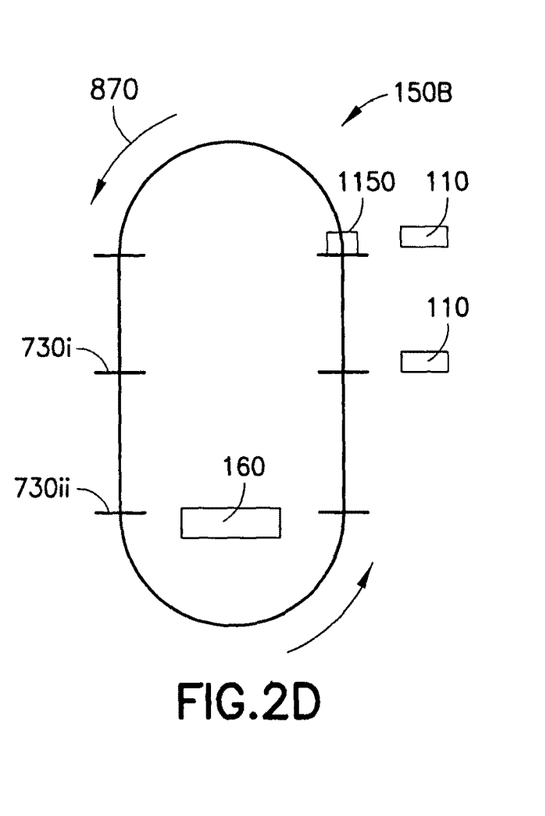
Figure 3A:
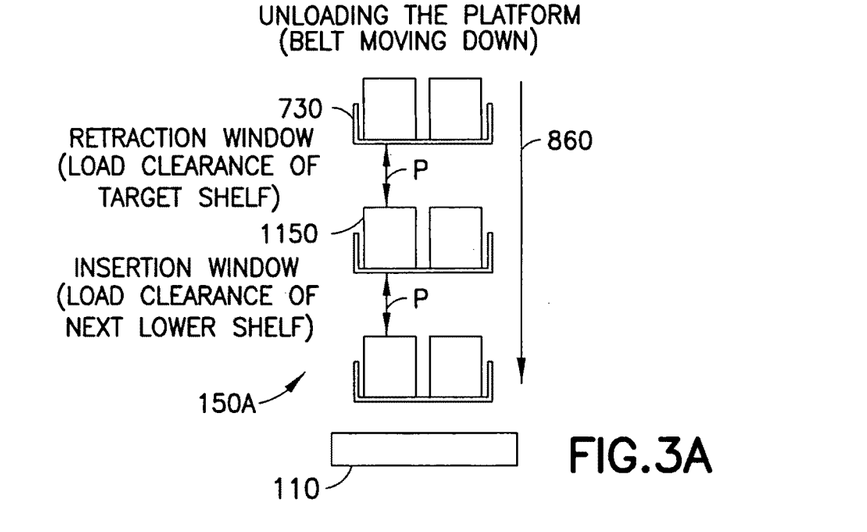
Figure 3B:
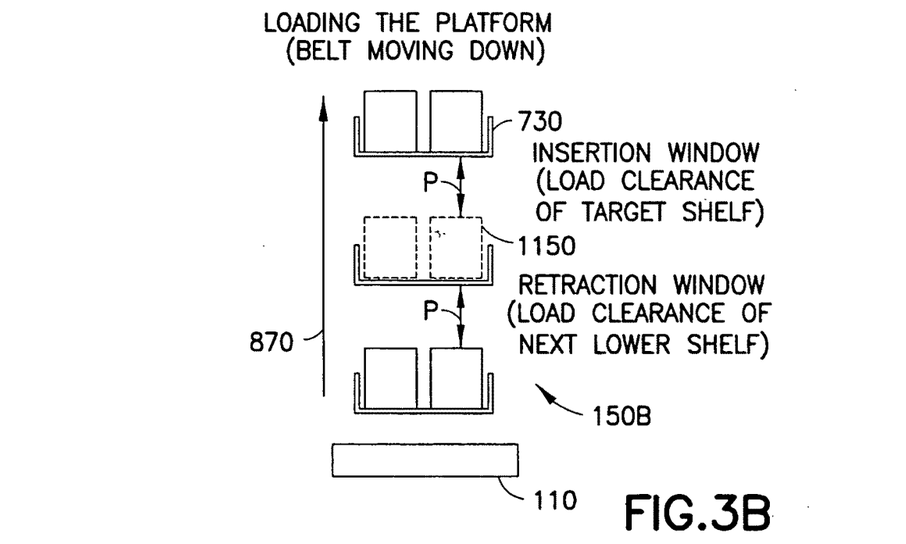

Referring to FIGS. 2D and 3B, for transferring loads in the outbound direction (e.g. moving pickfaces from or out of the storage and retrieval system) the bots 110 pick one or more pickface, such as pickface 1150, from a respective predetermined storage area of the storage structure (FIG. 8, Block 8020). The pickfaces may be extended into the path of the shelves 730 of the multilevel vertical conveyor 150B (which is substantially similar to conveyor 150A) by the transfer arm of bot 110 through an extension of the bot transfer arm relative to a frame of the bot 110. It is noted that the pickfaces, such as pickface 1150, may be placed on the multilevel vertical conveyor 150 in a first predetermined order sequence (FIG. 8, Block 8030). The first predetermined order may be any suitable order. The substantially continuous rate of movement of the shelves 730 in the direction of arrow 870 cause the fingers 910 of the shelf 730 to pass through the fingers of the bot transfer arm such that the movement of the shelf 730 effects lifting the pickface 1150 from the fingers of the bot transfer arm. The pickface 1150' travels around the multilevel vertical conveyor 150B to an out-feed transfer station 160 (which is substantially similar to in-feed transfer station 170) where is it removed from the shelf 730 by a conveyor mechanism 1030 in a manner substantially similar to that described above. The pickfaces may be removed from the multilevel vertical conveyor 150B by, for example the out-feed transfer stations 160 in a second predetermined order sequence that may be different and independent from the first predetermined order sequence (FIG. 8, Block 8040). The second predetermined order sequence may depend on any suitable factors such as, for example, the store plan rules described below.

It is noted that the respective transfer of pickfaces between the multilevel vertical conveyors 150A, 150B and the in-feed and out-feed transfer stations 170, 160 may occur in a manner substantially similar to that described above with respect to the bots 110 and bot transfer stations 140. In alternate embodiments transfer of pickfaces between the multilevel vertical conveyors 150A, 150B and the in-feed and out-feed transfer stations 170, 160 may occur in any suitable manner.

As can be seen in FIGS. 2C and 2D the shelves 730 of the multilevel vertical conveyors 150A, 150B are loaded and unloaded by the in-feed and out-feed transfer stations 170, 160 and the bots 110 from a common side of the shelf 730. For example, the shelves are loaded and unloaded in the common direction 999 (e.g. from only one side of the shelf 730). In this example, to facilitate loading the multilevel vertical conveyor from only one side of the shelf, the multilevel vertical conveyors 150A, 150B circumscribe a respective one of the in-feed and out-feed transfer stations 170, 160 so that the pickfaces 1150 travel around the in-feed and out-feed transfer stations 170, 160. This allows the in-feed and out-feed transfer stations 170, 160 to be placed on the same side of the shelves 730 as the bots 110 for transferring pickfaces (and the case units therein) to and from the multilevel vertical conveyors 150A, 150B.

Figure 7:
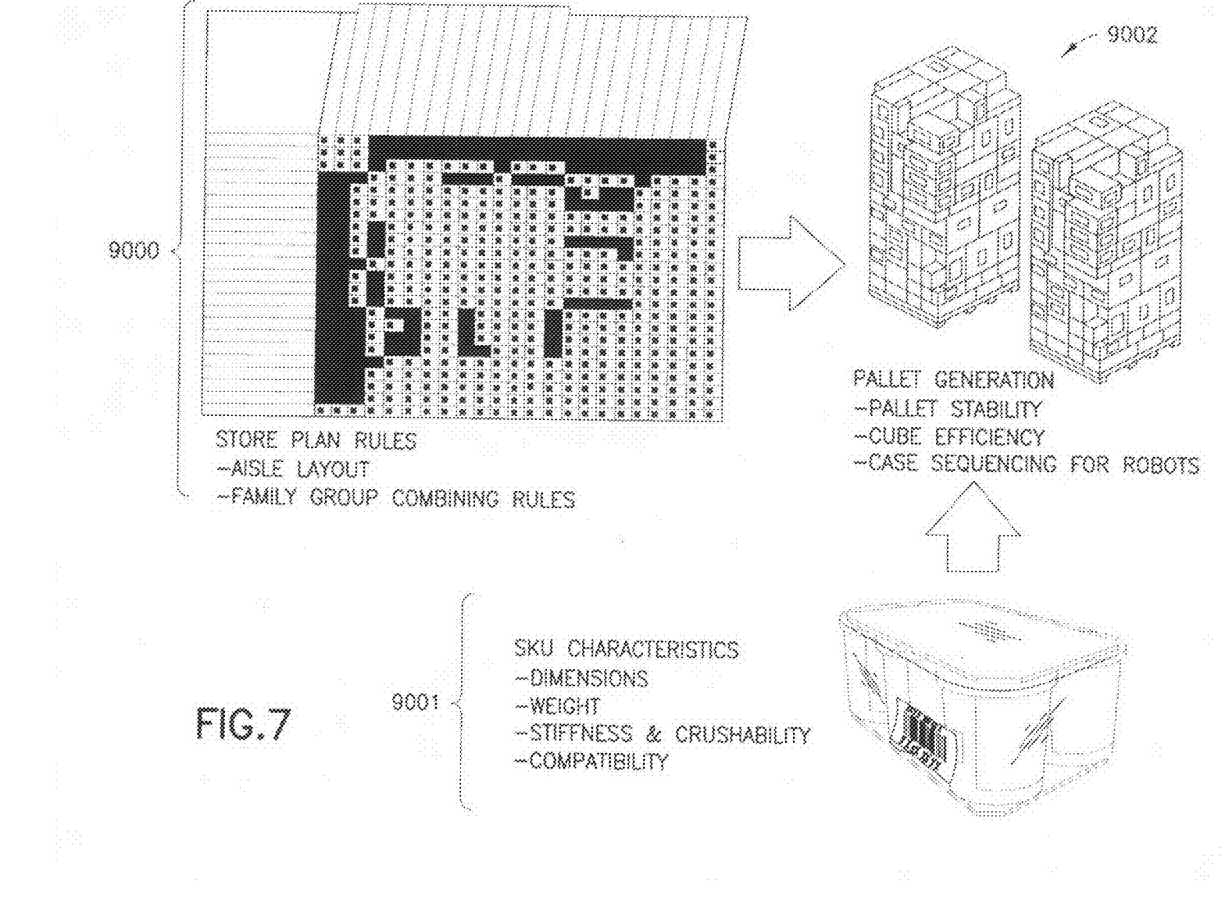
FIG. 7 is a schematic illustration of a method in accordance with an exemplary embodiment.

It is noted that the control server 120 may be configured to order the removal of case units from the storage and retrieval system for any suitable purpose, in addition to order fulfillment. In the exemplary embodiments, the distribution (e.g. sortation) of case units in the storage and retrieval system is such that the case units in the can be provided for delivery to a palletizing station in any suitable order at any desired rate using only two sortation sequences. The control server 120 may also be configured to incorporate, for example, store plan rules when fulfilling orders so that the cases are provided by the bots 110 to respective multilevel vertical conveyors 150B in a first predetermined sequence (e.g. a first sortation of case units) and then removed from the respective multilevel vertical conveyors 150B in a second predetermined sequence (e.g. a second sortation of case units) so that the case units may be placed on pallets or other suitable shipping containers/devices) in a predetermined order for building mixed pallets (see e.g. FIG. 8 described above). For example, in the first sortation of case units the bots 110 may pick respective case units (e.g. case unit) in any order. The bots 110 may traverse the picking aisles and transfer deck (e.g. circulate around the transfer deck) with the picked item until a predetermined time when the item is to be delivered to a predetermined multilevel vertical conveyor 150B. In the second sortation of case units, once the case units are on the multilevel vertical conveyor 150B the case units may circulate around the conveyor until a predetermined time when the items are to be delivered to the out-feed transfer station 160. Referring to FIG. 7, it is noted that the order of case units delivered to the pallets may correspond to, for example, store plan rules 9000. The store plan rules 9000 may incorporate, for example, an aisle layout in the customer's store or a family group of case units corresponding to, for example, a particular location in the store where the pallet will be unloaded or a type of goods. The order of case units delivered to the pallets may also correspond to characteristics 9001 of the case units such as, for example, compatibility with other case units, dimensions, weight and a durability of the case units. For example, crushable case units may be delivered to the pallet after heavier more durable case units are delivered to the pallet. The first and second sortations of the case units allow for the building of mixed pallets 9002 as described below.

The control server 120 in combination with the structural/mechanical architecture of the storage and retrieval system enables maximum load balancing. As described herein, the storage spaces/storage locations are decoupled from the transport of the case units through the storage and retrieval system. For example, the storage volume (e.g. the distribution of case units in storage) is independent of and does not affect throughput of the case units through the storage and retrieval system. The storage array space may be substantially uniformly distributed with respect to output. The horizontal sortation (at each level) and high speed bots 110 and the vertical sortation by the multilevel vertical conveyors 150B substantially creates a storage array space that is substantially uniformly distributed relative to an output location from the storage array (e.g. an out-feed transfer station 160 of a multilevel vertical conveyor 150B). The substantially uniformly distributed storage space array also allows case units to be output at a desired substantially constant rate from each out-feed transfer station 160 such that the case units are provided in any desired order. To effect the maximum load balancing, the control architecture of the control server 120 may be such that the control server 120 does not relate the storage spaces within the storage structure 130 (e.g. the storage array) to the multilevel vertical conveyors 150B based on a geographical location of the storage spaces (which would result in a virtual partitioning of the storage spaces) relative to the multilevel vertical conveyors 150B (e.g. the closest storage spaces to the multilevel vertical conveyor are not allocated to cases moving from/to that multilevel vertical conveyor). Rather, the control server 120 may map the storage spaces uniformly to each multilevel vertical conveyor 150B and then select bots 110, storage locations and output multilevel vertical conveyor 150B shelf placement so that case units from any location in the storage structure come out from any desired multilevel vertical conveyor output (e.g. at the out-feed transfer stations) at a predetermined substantially constant rate in a desired order for building the mixed pallets 9002.

It should be understood that the exemplary embodiments described herein may be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A transport system for a storage and retrieval system having an array of storage levels, each storage level having respective storage areas, the transport system comprising:
   a continuously moving vertical loop conveyor having a frame and support shelves movably coupled to the frame, each support shelf being configured to hold one or more uncontained case units in predetermined areas of the support shelf; and
   transfer vehicles disposed on respective ones of the storage levels, the continuously moving vertical loop conveyor having a conveyor to transfer vehicle interface configured to transfer the uncontained case units substantially directly between each support shelf and the transfer vehicles for transport to the storage areas in substantially one transfer vehicle picking operation.

2. The transport system of claim 1, wherein the predetermined areas comprise an array of areas.

3. The transport system of claim 1, wherein the support shelves include first elongated fingers and the transfer vehicles include second elongated fingers, the first and second elongated fingers being configured to pass between one another for transferring uncontained case units between each support shelf and the transfer vehicles.

4. The transport system of claim 1, wherein each support shelf of the continuously moving vertical loop conveyor is common to each storage area on each storage level.

5. The transport system of claim 1, wherein each support shelf of the continuously moving vertical loop conveyor is common to each storage space in the array of storage levels.

6. The transport system of claim 1, wherein each storage area has fixed structure that defines a seating surface contacting an uncontained case unit stored in the storage area.

7. An automated case unit storage system for handling case units that are adapted for being palletized for shipping to and from a warehouse, the automated case unit storage system comprising:
   a multilevel array of storage spaces arrayed on multiple static levels and in multiple rows at each level, each storage space of the array being capable of holding an uncontained case unit therein;
   a continuous vertical lift having a lift support configured for holding and lifting the uncontained case unit to the levels of the array, the continuous vertical lift substantially continuously moving the lift support at a substantially constant speed; and
   an input for inputting the uncontained case units onto the lift support of the continuous vertical lift;
   an output for outputting the uncontained case units from the lift support of the continuous vertical lift
   wherein the continuous vertical lift is configured so that outputted uncontained case units from the continuous vertical lift are disposed in a predetermined order that is independent from an order sequence in which the uncontained cases are input to the continuous vertical lift.

8. The automated case unit storage system of claim 7, wherein the continuous vertical lift is a common lift to each storage space on the at least one level.

9. The automated case unit storage system of claim 7, wherein the continuous vertical lift is a common lift to each storage space of the array of storage spaces.

10. The automated case unit storage system of claim 7, wherein the each storage space has fixed structure that defines a seating surface contacting the uncontained case unit stored in the storage space.

* * * * *